US012689501B2

(12) United States Patent
Xia et al.

(10) Patent No.: US 12,689,501 B2
(45) Date of Patent: Jul. 21, 2026

(54) SECURE KEY PROVISIONING AND HARDWARE-ASSISTED SECURE KEY STORAGE AND SECURE CRYPTOGRAPHIC FUNCTION OPERATION IN CONTAINER-BASED ENVIRONMENTS

(71) Applicant: Intel Corporation, Santa Clara, CA (US)

(72) Inventors: Haidong Xia, Folsom, CA (US); Mourad Cherfaoui, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 17/214,095

(22) Filed: Mar. 26, 2021

(65) Prior Publication Data

US 2021/0218559 A1     Jul. 15, 2021

(51) Int. Cl.
G06F 21/53          (2013.01)
H04L 9/08          (2006.01)
(Continued)

(52) U.S. Cl.
CPC ............ H04L 9/0825 (2013.01); G06F 21/53 (2013.01); H04L 9/0861 (2013.01);
(Continued)

(58) Field of Classification Search
CPC ....... H04L 9/0825; H04L 9/0861; H04L 9/14; H04L 9/3247; H04L 67/1097;
(Continued)

(56) References Cited

U.S. PATENT DOCUMENTS 9,942,042 B1 *   4/2018   Friedman .............. H04L 9/3231
10,615,968 B1 *   4/2020   Byrne ................. G06F 16/9027
(Continued)

FOREIGN PATENT DOCUMENTS

EP          3422234 A1 *   1/2019   ............. G06F 21/53

OTHER PUBLICATIONS

EPO Communication Pursuant to Article 94(3) EPC in EP Application Serial No. 22153672.5 mailed on Apr. 30, 2025, 4 pages.
(Continued)

*Primary Examiner* — Trong H Nguyen
(74) *Attorney, Agent, or Firm* — Alliance IP, LLC

(57)          ABSTRACT

A key caching container provides for the secure storage of cryptographic keys and the secure operation of cryptographic functions for workload containers. A cryptographic call adapter in each workload container converts application cryptographic operation requests made by an application to workload container cryptographic operation requests that are sent to the key caching container. Secure provision of keys is enabled by a key broker service that acts as a proxy for a key management service. A secure enclave within the key caching container stores keys and instructions that perform cryptographic operations in an encrypted format. The key caching container provides a key handle associated with a cryptographic key to a requesting application, which the application uses in subsequent application cryptographic operation requests. The secure enclave is created and managed using security-related instructions in a security-enabled integrated circuit component that is part of a computing system's hardware platform.

20 Claims, 7 Drawing Sheets

(51) Int. Cl.
    *H04L 9/14*        (2006.01)
    *H04L 9/32*        (2006.01)
    *H04L 67/1097*    (2022.01)

(52) U.S. Cl.
    CPC .............. *H04L 9/0894* (2013.01); *H04L 9/14*
        (2013.01); *H04L 9/3247* (2013.01); *H04L*
        *67/1097* (2013.01)

(58) Field of Classification Search
    CPC ..... H04L 9/0894; H04L 9/0822; G06F 21/53;
        G06F 21/602; G06F 9/45558; G06F
        21/62; G06F 21/64; G06F 21/78
    See application file for complete search history.

(56)           References Cited

U.S. PATENT DOCUMENTS

| | | | |
|---|---|---|---|
| 11,343,247 B1* | 5/2022 | Ozarkar | .................. H04L 67/56 |
| 11,586,752 B1* | 2/2023 | Ozarkar | .................. H04L 9/083 |
| 2016/0219073 A1* | 7/2016 | Mathur | .................. G06F 21/53 |
| 2016/0292431 A1* | 10/2016 | Sreekanti | ............. G06F 21/602 |
| 2021/0319142 A1* | 10/2021 | Kärkkäinen | .......... H04L 9/0891 |

OTHER PUBLICATIONS

EPO Communication pursuant to Article 94(3) EPC issued in Application No. 22 153 672.5, mailed Dec. 23, 2025, 6 pages.

\* cited by examiner

200

300

RECEIVE REQUEST TO PROVISION FIRST CRYPTOGRAPHIC KEY

310

SEND FIRST KEY HANDLE ASSOCIATED WITH FIRST CRYPTOGRAPHIC KEY

320

400

RECEIVE REQUEST TO PROVISION FIRST CRYPTOGRAPHIC KEY FROM KEY CACHING CONTAINER

410

SEND REQUEST FOR FIRST CRYPTOGRAPHIC KEY TO KEY MANAGEMENT SERVICE

420

RECEIVE FIRST CRYPTOGRAPHIC KEY FROM KEY MANAGEMENT SERVICE

430

ENCRYPT FIRST CRYPTOGRAPHIC KEY

440

SEND ENCRYPTED FIRST CRYPTOGRAPHIC KEY TO KEY CACHING CONTAINER

450

500

DEPLOY FIRST WORKLOAD CONTAINER TO FIRST COMPUTING SYSTEM

510

DEPLOYING KEY CACHING CONTAINER TO FIRST COMPUTING SYSTEM

520

SECURE KEY PROVISIONING AND HARDWARE-ASSISTED SECURE KEY STORAGE AND SECURE CRYPTOGRAPHIC FUNCTION OPERATION IN CONTAINER-BASED ENVIRONMENTS

BACKGROUND

In some existing cloud native computing environments, containers are deployed to computing systems under the control of orchestrators. These containers contain applications that may require the use of cryptographic keys to perform various cryptography functions, such as encryption and decryption. Some existing key management solutions use a hardware security module (HSM) to perform cryptography tasks. An HSM is a physical computing device or component that can be in the form of an add-in card or external device that directly attaches to a computing system.

DETAILED DESCRIPTION

Figure 1:
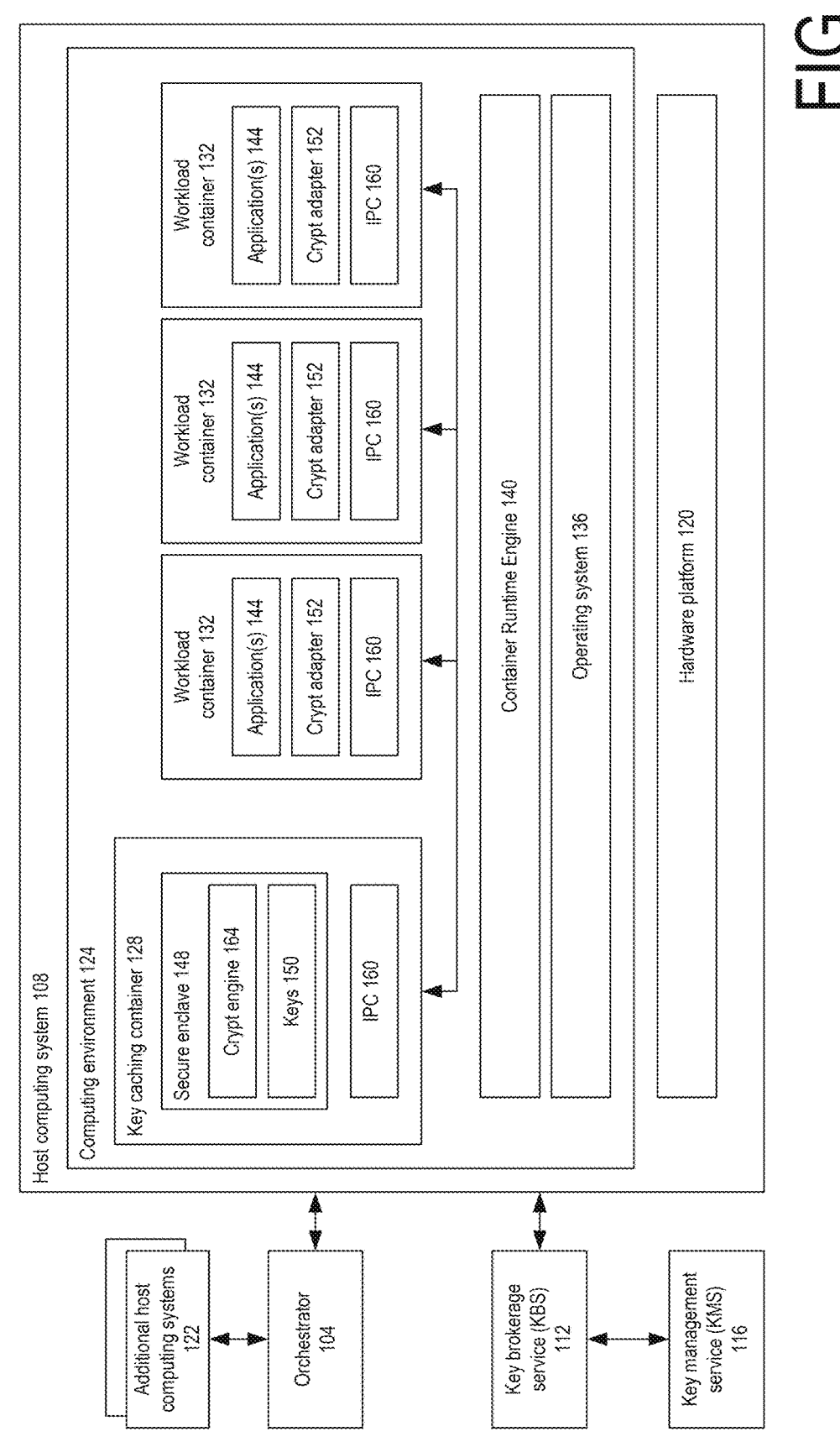
FIG. 1 is a block diagram of an example computing system for secure key provisioning and hardware-assisted secure key storage and secure cryptographic function operation.

In container-based operating system virtualization environments, cryptographic keys may need to be provisioned to allow applications operating within containers to perform various cryptography-related tasks, such as transport layer security (TLS) session establishment, digital signature generation, and encryption/decryption. Due to security concerns, these keys are not included in container images and are provisioned during container runtime. To ensure the security of container-based applications and any associated data, keys can be securely provisioned to the computer system upon which a container is executed and be kept secure while in use. This precludes the cryptographic keys from being loaded into the main memory of a computing system (e.g., DRAM) where they may be susceptible to attack. Existing approaches to protect cryptographic keys while they are in use rely on hardware security modules (HSMs), network HSMs, and trusted platform modules (TPMs), but operational, performance and cost concerns make adoption of these approaches in container-based environments challenging.

Disclosed herein are technologies that securely provision cryptographic keys to containers and provide hardware-assisted secure key storage and secure cryptographic function operation in container-based environments. A key caching container utilizes security features of the host computing system's hardware platform to provide secure key storage and secure cryptographic function operation for other containers operating on the same (or different) host computing system. In some embodiments, keys are securely stored in and cryptographic operations are securely performed in a secure enclave.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

As used herein, the term "integrated circuit component" refers to a packaged or unpacked integrated circuit product. A packaged integrated circuit component comprises one or more integrated circuits mounted on a package substrate. In one example, a packaged integrated circuit component contains one or more processor units mounted on a substrate, with an exterior surface of the substrate comprising a solder ball grid array (BGA). In one example of an unpackaged integrated circuit component, a single monolithic integrated circuit die comprises solder bumps attached to contacts on the die. The solder bumps allow the die to be directly attached to a printed circuit board. An integrated circuit component can comprise one or more of any computing system component described or referenced herein or any other computing system component, such as a processor unit (e.g., system-on-a-chip (SoC), processor core, graphics processor unit (GPU), accelerator), I/O controller, chipset processor, memory, or network interface controller.

As used herein, the terms "operating", "executing", or "running" as they pertain to software or firmware in relation to a computing system, device, platform, or resource are used interchangeably and can refer to software or firmware stored in one or more computer-readable storage media accessible by the computing system, device, platform or resource, even though the instructions contained in the software or firmware are not actively being executed by the computing system, device, platform, or resource.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an example computing system for secure key provisioning and hardware-assisted secure key storage and secure cryptographic function operation. The system 100 is a container-based computing system comprising an orchestrator 104, a host computing system 108, a key broker service 112, a key management service 116, and additional host computing systems 122. The orchestrator 104 is responsible for managing the system 100 and is responsible for various container-related tasks such as deploying container images to the host computing systems 108 and 122, monitoring the performance of deployed containers, and monitoring the utilization of resources of the host computing systems 108 and 122.

The host computing system 108 comprises a hardware platform 120 upon which a computing environment 124 is established. The computing environment 124 comprises a key caching container 128, multiple workload (or application) containers 132, an operating system 136, and a container runtime engine 140. The key caching container 128 and the workload containers 132 are running instances of key caching container images and workload container images deployed to the host computing system 108 by the orchestrator 104. The key caching container 128 and the workload containers 132 operate on top of the container runtime engine 140, which in turn operates within the operating system 136. In some embodiments, the computing environment comprises one or more container runtime images operating on top of a hypervisor (or virtual machine monitor (VMM)), thus allowing different container runtime engines that support different container types to operate on a single host computing system. A hypervisor can be a bare metal (or type 1) hypervisor that operates directly on a computing system's hardware platform or a hosted (or type 2) hypervisor that operates as a software layer on top of an operating system. In some embodiments, the container-based system 100 utilizes a cloud native computing approach and operates within a public, private, or hybrid cloud architecture.

As used herein, the term "container image" refers to a package of binary images for one or more applications and any libraries, configuration settings, and any other information that the applications need for execution. A container image can conform to any container image format, such as Docker®, Appc, or LXC container image formats. As used herein, the term "container" refers to a running instance of a container image.

The hardware platform 120 comprises one or more security-enabled integrated circuit components. In some embodiments, a security-enabled integrated circuit component comprises one or more processing units (e.g., processor cores, CPU, GPU, XPU) that support an instruction set comprising a set of security-related instructions in addition to a set of general-purpose instructions. That is, the security-enabled integrated circuit components are not dedicated security processors. In some embodiments, the security-related instructions allow for the creation and operation of secure enclaves. A secure enclave comprises a region of main memory (e.g., memory located external to the integrated circuit component responsible for executing applications on the computing system, such as DRAM), the contents of which are encrypted and are unable to be accessed by any software outside of the secure enclave (e.g., other processes, the operating system kernel, firmware). The encryption and decryption of secure enclave contents (e.g., data, instructions) occur "in-line" in that encrypted secure enclave contents are decrypted upon being accessed and information to be stored in the secure enclave is encrypted upon being written to the secure enclave. Information read from or written to a secure enclave is decrypted or encrypted within the integrated circuit component that executes applications on the computing system, which ensures that secure enclave contents are encrypted as they travel across the interface between the integrated circuit component and the main memory.

In some embodiments, the contents of the secure enclave are encrypted with a key derived from one or more fixed keys programmed into a processing unit during manufacture. Thus, only an integrated circuit component comprising such a processing unit can decrypt secure enclave contents.

In some embodiments, a security-enabled integrated circuit component comprises one or more security-enabled processing units, cache memory, and a memory controller that retrieves information from main memory to be placed in the cache memory and sends information evicted from the cache memory to the main memory for storage. The security-enabled processing units support security-related instructions that enable the generation and operation of a secure enclave in addition to supporting a general-purpose instruction set. Security-related instructions that enable the generation and operation of a secure enclave can include instructions that create an enclave, initialize an enclave, add a page to the enclave, remove a page from the enclave, enter an enclave, and exit an enclave. If the memory controller determines that the memory address for a region of main memory being read from or written to falls within a memory address range for a secure enclave, the memory controller encrypts the information being written to the secure enclave in advance of the information being written to the secure enclave and decrypts the information being read from the secure enclave upon receipt of the encrypted information from the secure enclave.

In some embodiments, the security-enabled integrated circuit component is an Intel® processor enabled with software guard extensions (SGX). These processors support a security-related instruction set in addition to a general-purpose instruction set. Intel® SGX processors comprise one or more processing cores that support the SGX instruction set, which allows for the generation and support of secure enclaves. SGX secure enclaves reside in an enclave page cache (EPC) that resides in a portion of main memory reserved for the processor that cannot be directly accessed by other software, including system software. In an Intel® SGX processor, the encryption and decryption of information being read from or written to a secure enclave can be performed by a memory encryption engine (MEE) located within an Intel® SGX processor or a memory encryption instruction set extension.

In other embodiments, a security-enabled integrated circuit component comprises one or more security-enabled processing units that support a set of security-related instructions that operate within a secure partition of computing system resources in addition to a general-purpose instruction set that operates within a standard (non-secure) partition of computing system resources. In these embodiments, the data and instructions belonging to the secure partition do not travel beyond the cache memory of the security-enabled integrated circuit component in the computing system memory hierarchy, allowing the data and instructions belonging to the secure partition to remain unencrypted.

In some embodiments, a security-enabled integrated circuit component is a dedicated security processing unit, such as a secure enclave coprocessor or a security coprocessor, that is physically separate from other processing units that execute instructions outside of a secure environment (e.g., secure partition, secure enclave) of a computing system. The dedicated security processing unit may or may not support a general-purpose instruction set in addition to a security-related instruction set. Instructions executed by and data acted upon by the security processing unit are stored in encrypted main memory and are encrypted/decrypted as they are written to/read from main memory. A hardware cryptographic acceleration processing unit that is separate from the security processing unit can be used to speed the encryption and decryption of data and instructions written to and read from main memory.

The container runtime engine 140 provides an interface between the operating system 136 and the key caching container 128 and the workload containers 132. The container runtime engine 140 can be Docker Engine, LXC, an open container initiative (OCI)-compatible container runtime (e.g., Railcar, CRI-O), or any other container runtime engine. The operating system can be Linux®, Windows Server®, or any other operating system for which a container runtime engine is available. Within a particular container ecosystem, multiple container runtime engines may be available, with different container runtime engines providing a standardized container interface to a different operating system. Thus, the multiple container runtime engines together allow containers to be developed and deployed without having dependencies upon a host computing system's operating system/VMM or hardware.

In some embodiments, the key caching container 128 and the workload containers 132 are Docker® containers and are runtime instances of Docker® container images and the container runtime engine 140 is Docker Engine. In some embodiments, the key caching container 128 and the workload containers 132 are part of a Kubernetes open source container-orchestration system and are runtime instances of container images deployed to the host computing system 108 as Docker® container images. The container runtime engine 140 can be Docker Engine, containerd, or a Kubernetes Container Runtime Interface (CRI)-compliant container runtime engine. In a Kubernetes environment, the key caching container 128 can be deployed as a DaemonSet, which ensures that all nodes within a Kubernetes cluster are running an instance of the key caching container.

The key caching container 128 securely provisions cryptographic keys requested by an application 144, securely provisions the keys, and securely performs cryptographic operations that use the keys. Thus, the key caching container 128 provides a resource that the workload containers 132 can use for secure key protection and the secure offloading of cryptographic functions. Provisioned keys 150 are stored in a secure enclave 148. The secure enclave 148 also stores instructions that, when executed, implement a cryptography engine 164. The cryptography engine 164 can perform various cryptography related tasks, such as encryption, decryption, hashing, and digital signing. The key caching container 128 also comprises an untrusted portion that performs tasks related to key provision, key storage, and management of the cryptography engine 164. In some embodiments, the secure enclave 148 is created and managed by instructions in the key caching container 128 that cause security-related instructions of a security-enabled processing unit in the hardware platform 120 to be executed.

One or more applications 144 and a cryptography call adapter 152 operate within each of the workload containers 132. When an application 144 loads a cryptographic key, generates a cryptographic key, or performs a cryptographic function, the application 144 calls its associated cryptography call adapter 152. The cryptography call adapter 152 converts a call to a cryptography library that the application 144 is linked to (an application cryptographic operation request) into a call to a cryptography library implemented in the cryptography engine 164 (a workload container cryptographic operation request). For example, if an application 144 is linked to an OpenSSL or golang cryptography library and the cryptography engine 164 implements a Public Key Cryptography Standard (PKCS) library, such as PKCS #11, the cryptography call adapter 152 can convert the application's OpenSSL or golang library API call into a PKCS #11 library API call. If the cryptography library linked to the application 144 is the same as the cryptography library implemented in the cryptography engine 164, no conversion is needed (the application cryptographic operation request is the same as the workload container cryptographic operation request) and the workload container 132 can either not include a cryptography call adapter 152 or the adapter 152 passes the application's cryptography library call without conversion. As an application's cryptography call that might otherwise be accommodated by an HSM is routed to the cryptography engine 164, the cryptography engine 164 can be considered to be a software security module.

The key caching container 128 and the workload containers 132 each further comprise an inter-process communication (IPC) module 160 that enables communication between containers. In some embodiments, the IPC modules 160 utilize the open source gRPC remote procedure call framework. In other embodiments, the IPC module 160 can utilize network protocols (e.g., HTTPS (HyperText Transfer Protocol Secure), plain TCP over TLS) to provide inter-container communication. An IPC module 160 can provide for communication between containers operating on the same host computing system or different host computing systems.

A container can serialize information before sending it to another container and deserialize serialized information received from another container, and a communication channel between containers can be mutually authenticated before information is sent across the channel. In some embodiments, information sent across a communication channel between containers is encrypted.

In some embodiments, a cryptographic key can be provisioned to an application as follows. A container image for a workload container 132 is configured with key identifiers for cryptographic keys that an application 144 may need access to. The key identifiers uniquely identify the keys to the key broker service 112. In some embodiments, the key identifier can be a uniform resource identifier (URI). When an application 144 is to load or generate a cryptographic key, it makes the appropriate application cryptographic operation request to the cryptographic call adapter 152 using the key's unique identifier, and the workload container 132 converts the application cryptographic operation request to a workload container cryptographic operation request comprising the key unique identifier and sends the workload container cryptographic operation request to the key caching container 128.

After receiving the workload container cryptographic operation request from the workload container 132, the key caching container 128 submits a request for a cryptographic key to the key broker service 112 that includes the key identifier provided by the workload container 132. The key caching container 128 also sends a signed and remotely verifiable claim that is generated for the secure enclave 148 that the key broker service 112 uses for attestation of the enclave 148. The signed claim contains one or more secure enclave attributes and an enclave public key that is part of an enclave public-private key pair generated within the secure enclave 148. In some embodiments, the signed claim includes a hash of the enclave public key instead of including the enclave public key directly.

Prior to the key caching container 128 submitting the request for a cryptographic key to the key broker service 112, the channel between the key broker service 112 and the key caching container 128 can be mutually authenticated. Information sent along the communication channel between the key broker service 112 and the key caching container 128 can be encrypted. In some embodiments, this communication channel is encrypted using HTTPS. Before providing a requested key to the key caching container 128, the key broker service 112 performs an attestation of the signed claim provided by the key caching container 128. The key broker service 112 can confirm that the signed claim has been generated within a secure enclave by sending the signed claim to an attestation service. Once the signed claim has been validated by the attestation service, the key broker service 112 ensures that the enclave public key provided by the key caching container 128 is genuine either because it was included in the signed claim or, if a hash of the enclave public key was included in the signed claim and the enclave public key was provided separately from the signed claim, the enclave public key hash included in the signed claim matches a hash of the enclave public key generated by the attestation service.

In some embodiments, the attestation service can be provided by the vendor of the security-enabled integrated circuit component and the attestation service can attest that the signed claim was generated within a secure enclave created by a vendor-supplied integrated circuit. In embodiments where the security-enabled integrated circuit component is an Intel® SGX-enabled processor, the key broker service 112 can utilize Intel®'s SGX attestation infrastructure, such as the Intel® SGX Data Center Attestation Primitives (Intel® SGX DCAP) or SGX attestation features available in the Intel Security Libraries for Data Center (Intel® SecL—DC) to perform attestation on the signed claim provided by the key caching container 128.

After successful attestation, the key broker service 112 sends a request to the key management service 116 for the key requested by the key caching container 128 and the key management service 116 provides the requested key to the key broker service 112 in response to the request. The key management service 116 can generate a new key or provide an already-generated key in response to the request. In some embodiments, the key management service 116 does not store newly generated keys, with the system 100 instead relying upon the secure enclave 148 for secure key storage. In other embodiments, the key management service 116 securely stores generated keys (e.g., in an HSM local to the key management service 116). Whether the requested key is newly-generated or already-generated by the key management service 116, the key broker service 112 encrypts the requested key with a symmetric encryption key known only to the key broker service 112 and the key caching container 128 and sends the encrypted requested key to the key caching container 128. The key caching container 128 then decrypts the encrypted requested key with the symmetric encryption key.

If a symmetric encryption key for encrypting the requested key has not yet been generated, the key broker service 112 generates the symmetric encryption key, encrypts it with the enclave public key, and sends the encrypted symmetric encryption key to the key caching container 128. The secure enclave 148 then decrypts the symmetric encryption key with the enclave private key and the secure enclave 148 and the key broker service 112 now both know the symmetric encryption key. In some embodiments, the symmetric key is generated and encrypted with the enclave public key by the key management service 116. In this case, the key broker service 112 only sees an encrypted version of the key requested by the key caching container 128.

Upon receipt and decryption of the requested key, the key caching container 128 generates a key handle for the requested key and provides the key handle to the workload container 132. The workload container 132 passes the key handle to the application via a response to the application cryptographic operation request that requested the key. The provisioned key is securely stored as one of the keys 150 in the secure enclave 148. A key handle can be any kind of identifier or data structure that the key caching container 128 can use to uniquely identify a key among the keys 150 stored in the secure enclave 148. To utilize a stored key 150 for a cryptographic operation, a workload container 132 provides the corresponding key handle to the key caching container 128. As multiple workload containers 132 can communicate with a single key caching container 128, the key caching container 128 restricts the use of a key 150 to the workload container 132 that originally requested the key.

The key broker service 112 can be any type of resource accessible to the key caching container 128. For example, the key broker service 112 can be a remote service (e.g., provided by a remote server) available over a network connection. In some embodiments, the key broker service 112 can be a service operating within a container under the management of the orchestrator 104. Thus, in a container embodiment, the key broker service 112 could be executing on the same host computing system as the key caching container 128 or one of the additional host computing systems 122.

The key management service 116 can be a remote service (e.g., a remote server) accessible to the key broker service 112 that provides cryptographic keys to the key broker service 112. Having two separate entities—the key broker service 112 and the key management service 116—handle key generation, attestation, and secure key provisioning allows for the use of existing key management services (e.g., open-source or commercial key management services) for the key management service 116. That is, existing key management services may not be capable of performing secure enclave attestation. However, in some embodiments, a single entity, such as a key provisioning service, can perform secure enclave attestation and key generation functions.

With a requested cryptographic key provisioned and stored as one of the keys 150 in the secure enclave 148, and a key handle corresponding to the provisioned key provided to the requesting workload container 132 and the requesting application 144, a cryptographic operation can be performed for the application 144 as follows. The application 144 makes an application cryptographic operation request to the cryptographic call adapter 152, identifying the cryptography key to be used in the requested cryptographic operation by the key's unique identifier (e.g., key handle). The workload container 132 converts the application cryptographic operation request to a workload container cryptographic operation request comprising the key handle associated with the key, information identifying the requested cryptographic operation to be performed, and any input data that the requested cryptographic operation is to act upon to the key caching container 128. The key handle, cryptographic operation identifying information, and input data are processed by the untrusted portion of the key caching container 128 and the requested cryptographic operation is performed on the input data by the secure enclave 148 to generate output data. The output data is sent by the key caching container 128 to the requesting workload container 132 and passed to the requesting application 144.

The following example illustrates the execution of a cryptographic operation for an application utilizing the technologies described herein. Consider the system 100 operating in a cloud native environment implementing a Kubernetes-based container orchestration system. The workload containers 132 and the key caching container 128 are part of a Kubernetes pod on the host computing system 108, a Kubernetes node. It is not required that the key caching container 128 and the workload containers 132 are part of the same pod—a key caching container 128 can support workload containers operating in multiple Kubernetes pods. An application 144 in one of the workload containers 132 utilizes the golang cryptography library for performing cryptographic operations and the secure enclave 148 implements cryptography operations from the PKCS #11 cryptographic library. The application makes a golang cryptographic library call to its associated adapter 152 that includes the key handle for the key to be used in an encryption operation, information identifying that the cryptographic operation to be performed is an encryption operation, and input data to be encrypted. The adapter 152 converts the golang cryptography library call (the application cryptographic operation request) to a PKCS #11 cryptography library call (the workload container cryptographic operation request) that comprises the key handle, information identifying that the PKCS #11 cryptographic operation to be performed is an encryption operation, and the input data. After the channel between the requesting workload container 132 and the key caching container 128 is mutually authenticated, the PKCS #11 cryptography library call is serialized and sent to the key caching container 128 using gRPC by the requesting workload container 132.

Upon receiving the PKCS #11 cryptographic library call from the requesting workload container 132, the key caching container 128 deserializes the workload container cryptographic operation request. The PKCS #11 library call is handled by the key caching container 128, with the input data being encrypted by the requested PKCS #11 encryption operation. The encryption is performed in the secure enclave 148 by the cryptography engine 164, using the stored PKCS #11 key 150 associated with the key handle provided in the workload container cryptographic operation request. The output data is passed back to the requesting workload container 132 in serialized and encrypted form and is provided to the application 144 via the cryptographic call adapter 152 in the form of a response to the golang cryptographic library call.

The secure key provisioning and hardware-assisted secure key storage and secure cryptographic function operation technologies disclosed herein may have at least the following advantages. First, unlike HSMs, software-based key caching containers can be deployed remotely and their deployment can be readily scaled. Physical access to a remote host computing system is not required to install or attach an HSM to enable secure key storage or confidential cryptographic function operation. Second, with a single key caching container capable of supporting multiple workload containers, the developmental and operational overhead of deploying workload containers that each have their own secure enclave is avoided. Third, key caching containers avoid the costs of purchasing and installing physical HSM in host computing systems.

Figure 2:
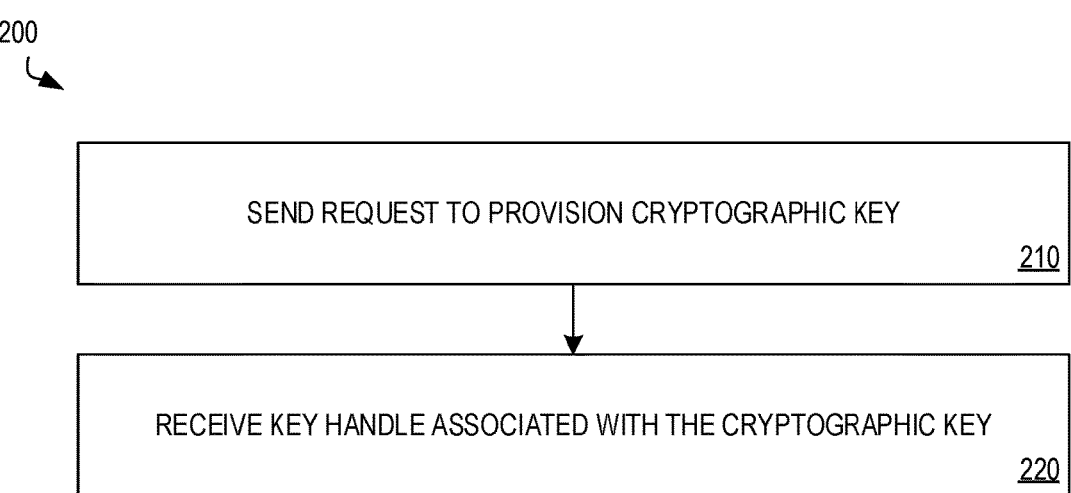
FIG. 2 is a flowchart of a first example method of requesting a cryptographic key.

FIG. 2 is a flowchart of a first example method of requesting a cryptographic key. The method 200 can be performed by a workload container operating on a server. At 210, a workload container cryptographic operation request is sent from a workload container to a key caching container, the workload container cryptographic operation request comprising a request for a cryptographic key. At 220, a key handle associated with the cryptographic key is received from the key caching container at the workload container.

Figure 3:
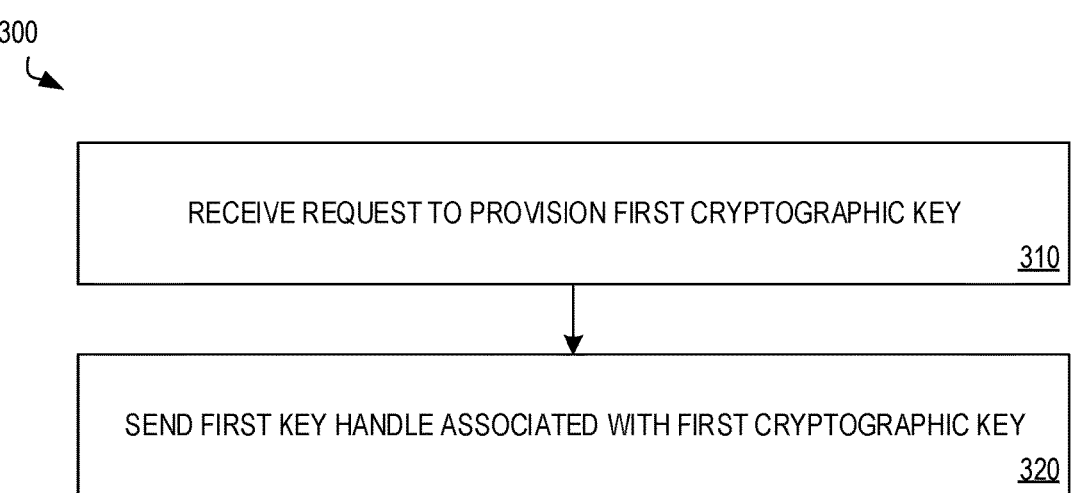
FIG. 3 is a flowchart of a second example method of requesting a cryptographic key.

FIG. 3 is a flowchart of a second example method of requesting a cryptographic key. The method 300 can be performed by a key caching container operating on a server. At 310, a workload container cryptographic operation request is received from a workload container at a key caching container. The workload container cryptographic operation request comprising a request for a cryptographic key. At 320, a key handle associated with the cryptographic key is sent from the key caching container to the workload container.

Figure 4:
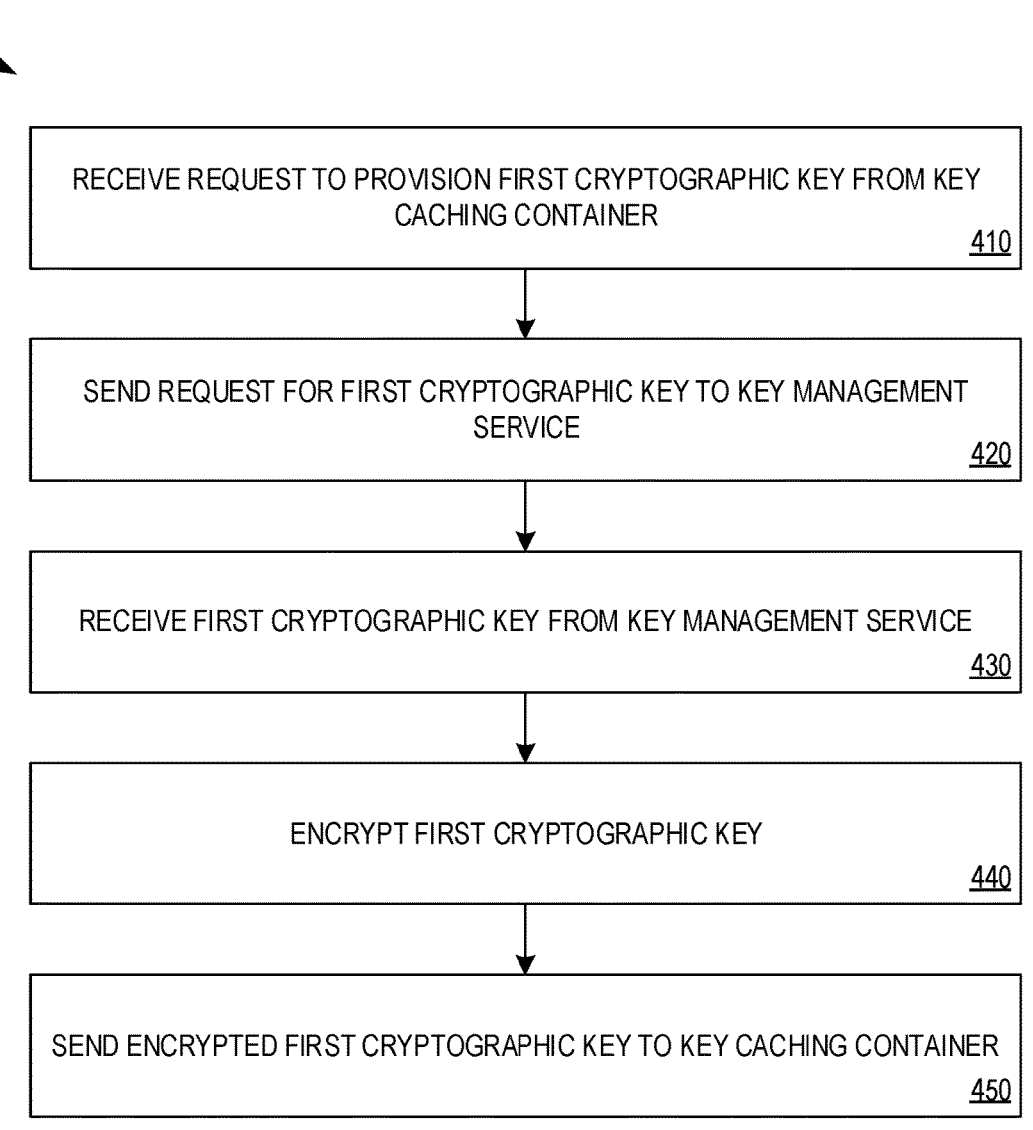
FIG. 4 is a flowchart of a third example method of requesting a cryptographic key.

FIG. 4 is a flowchart of a third example method of requesting a cryptographic key. The method 400 can be performed by a key broker service. At 410, a request for a cryptographic key is received from a key caching container. At 420, the cryptographic key is requested from a key management service. At 430, the cryptographic key is received from the key management service. At 440, the cryptographic key is encrypted. At 450, the encrypted cryptographic key is sent to the key caching container.

Figure 5:
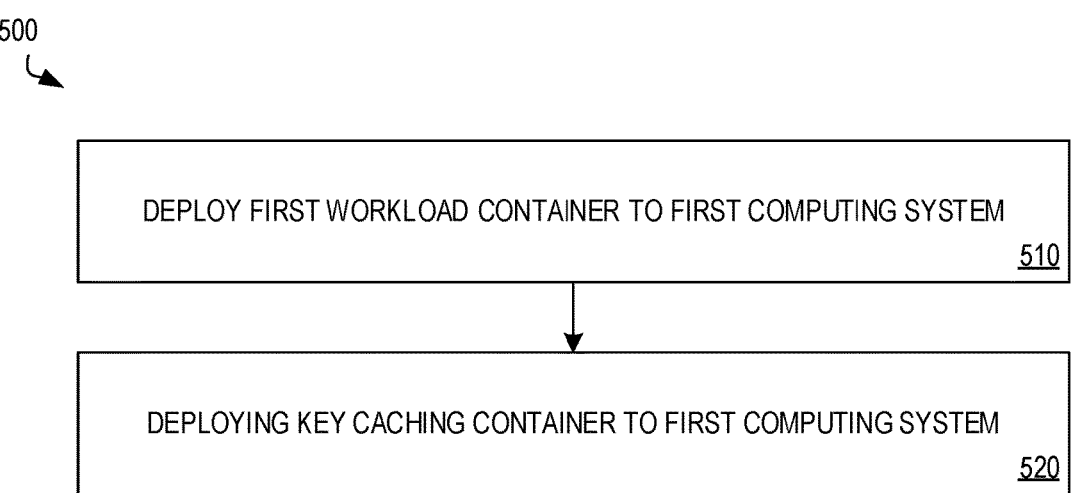
FIG. 5 is a flowchart of an example container deployment method.

FIG. 5 is a flowchart of an example container deployment method. The method 500 can be performed by a container orchestrator. At 510, a plurality of workload containers are deployed to one or more computing systems. Each workload container comprises: an application; and a cryptographic call adapter to convert application cryptographic operation requests made by the application to workload container cryptographic operation requests to be sent to a key caching container. At 520, the key caching container is deployed to one of the one or more computing systems. The key caching container is to: provision a cryptographic key in response to receiving a first workload container cryptographic operation request comprising a request for the cryptographic key; store the cryptographic key in a secure enclave; and perform a cryptographic operation on input data utilizing the cryptographic key in response to receiving a second workload container cryptographic operation request comprising a key handle associated with the cryptographic key, input data, and information indicating the cryptographic operation to be performed on the input data by the key caching container, the cryptographic operation to utilize the cryptographic key, the cryptographic operation to be performed in the secure enclave.

11

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blade, tray, or sled computing systems)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

Figure 6:
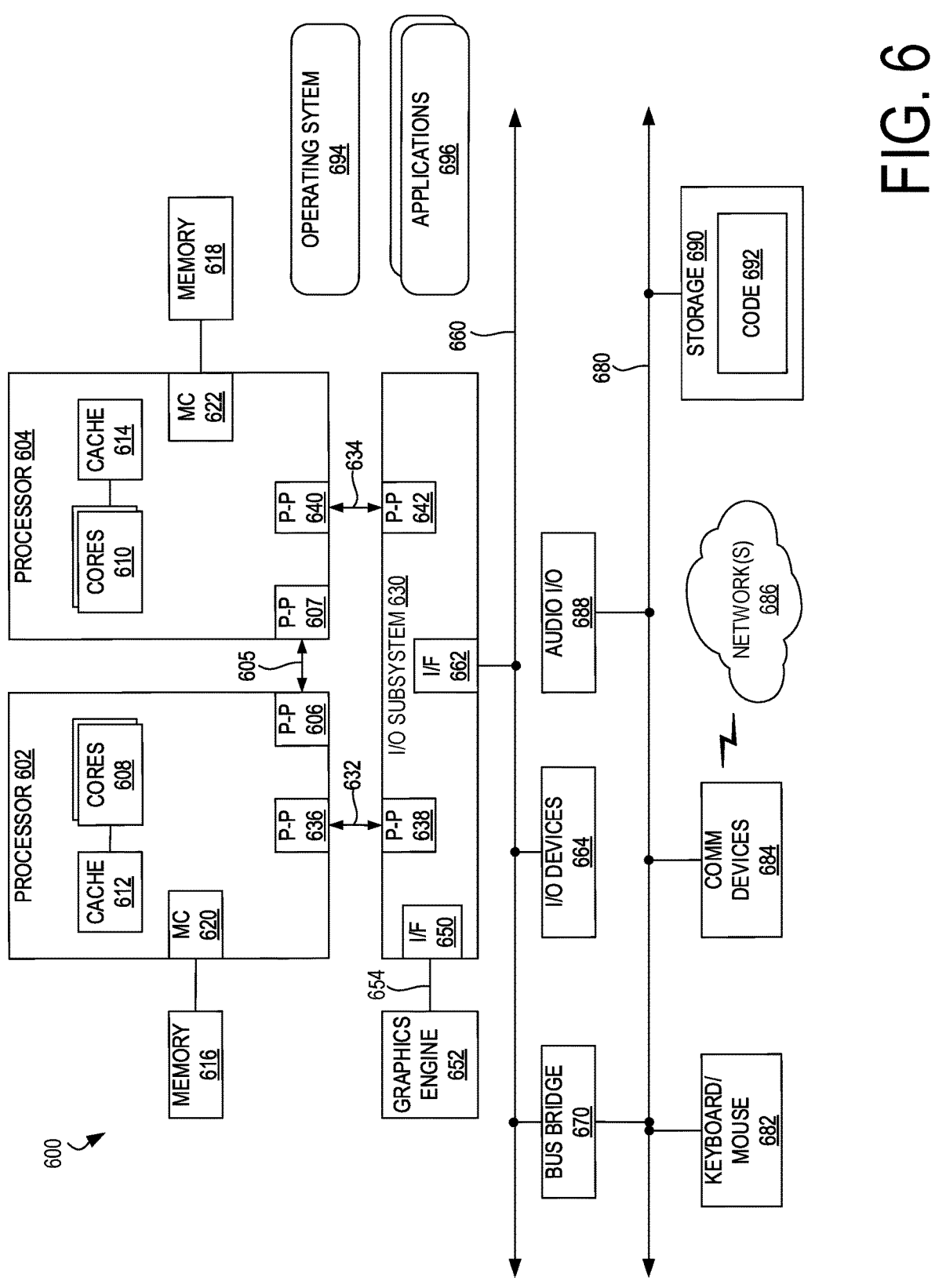
FIG. 6 is a block diagram of an example computing system in which technologies described herein may be implemented.

FIG. 6 is a block diagram of an example computing system in which technologies described herein may be implemented. Generally, components shown in FIG. 6 can communicate with other shown components, although not all connections are shown, for ease of illustration. The computing system 600 is a multiprocessor system comprising a first processor unit 602 and a second processor unit 604 comprising point-to-point (P-P) interconnects. A point-to-point (P-P) interface 606 of the processor unit 602 is coupled to a point-to-point interface 607 of the processor unit 604 via a point-to-point interconnection 605. It is to be understood that any or all of the point-to-point interconnects illustrated in FIG. 6 can be alternatively implemented as a multi-drop bus, and that any or all buses illustrated in FIG. 6 could be replaced by point-to-point interconnects.

The processor units 602 and 604 comprise multiple processor cores. Processor unit 602 comprises processor cores 608 and processor unit 604 comprises processor cores 610. Processor cores 608 and 610 can execute computer-executable instructions in a manner similar to that discussed below in connection with FIG. 7, or other manners.

Processor units 602 and 604 further comprise cache memories 612 and 614, respectively. The cache memories 612 and 614 can store data (e.g., instructions) utilized by one or more components of the processor units 602 and 604, such as the processor cores 608 and 610. The cache memories 612 and 614 can be part of a memory hierarchy for the computing system 600. For example, the cache memories 612 can locally store data that is also stored in a memory 616 to allow for faster access to the data by the processor unit 602. In some embodiments, the cache memories 612 and 614 can comprise multiple cache levels, such as level 1 (L1), level 2 (L2), level 3 (L3), level 4 (L4), and/or other caches or cache levels, such as a last level cache (LLC). Some of these cache memories (e.g., L2, L3, L4, LLC) can be shared among multiple cores in a processor unit. One or more of the higher levels of cache levels (the smaller and faster caches) in the memory hierarchy can be located on the same integrated circuit die as a processor core and one or more of the lower cache levels (the larger and slower caches) can be located on integrated circuit dies that are physically separate from the processor core integrated circuit dies.

Although the computing system 600 is shown with two processor units, the computing system 600 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 600 can comprise one or more processor units that are heterogeneous or asymmetric to another processor unit in the computing system. There can be a variety of differences between the processing units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 602 and 604 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetry can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 602 and 604 further comprise memory controller logic (MC) 620 and 622. As shown in FIG. 6, MCs 620 and 622 control memories 616 and 618 coupled to the processor units 602 and 604, respectively. The memories 616 and 618 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 620 and 622 are illustrated as being integrated into the processor units 602 and 604, in alternative embodiments, the MCs can be external to a processor unit.

Processor units 602 and 604 are coupled to an Input/Output (I/O) subsystem 630 via point-to-point interconnections 632 and 634. The point-to-point interconnection 632 connects a point-to-point interface 636 of the processor unit 602 with a point-to-point interface 638 of the I/O subsystem 630, and the point-to-point interconnection 634 connects a point-to-point interface 640 of the processor unit 604 with a point-to-point interface 642 of the I/O subsystem 630. Input/Output subsystem 630 further includes an interface 650 to couple the I/O subsystem 630 to a graphics engine 652. The I/O subsystem 630 and the graphics engine 652 are coupled via a bus 654.

The Input/Output subsystem 630 is further coupled to a first bus 660 via an interface 662. The first bus 660 can be a Peripheral Component Interconnect Express (PCIe) bus or any other type of bus. Various I/O devices 664 can be coupled to the first bus 660. A bus bridge 670 can couple the first bus 660 to a second bus 680. In some embodiments, the second bus 680 can be a low pin count (LPC) bus. Various devices can be coupled to the second bus 680 including, for example, a keyboard/mouse 682, audio I/O devices 688, and a storage device 690, such as a hard disk drive, solid-state drive, or another storage device for storing computer-executable instructions (code) 692 or data. The code 692 can comprise computer-executable instructions for performing methods described herein. Additional components that can be coupled to the second bus 680 include communication device(s) 684, which can provide for communication between the computing system 600 and one or more wired or wireless networks 686 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

In embodiments where the communication devices 684 support wireless communication, the communication devices 684 can comprise wireless communication components coupled to one or more antennas to support communication between the computing system 600 and external devices. The wireless communication components can support various wireless communication protocols and technologies such as Near Field Communication (NFC), IEEE 802.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 600 can comprise removable memory such as flash memory cards (e.g., SD (Secure Digital) cards), memory sticks, Subscriber Identity Module (SIM) cards). The memory in system 600 (including caches 612 and 614, memories 616 and 618, and storage device 690) can store data and/or computer-executable instructions for executing an operating system 694 and application programs 696 (which can be operating inside containers). Example data includes web pages, text messages, images, sound files, video data, and container image files to be sent to and/or received from one or more network servers or other devices by the system 600 via the one or more wired or wireless networks 686, or for use by the system 600. The system 600 can also have access to external memory or storage (not shown) such as external hard drives or cloud-based storage.

The operating system 694 can control the allocation and usage of the components illustrated in FIG. 6 and support the one or more application programs 696 or containers. The application programs 696 can include common computing system applications (e.g., email applications, calendars, contact managers, web browsers, messaging applications) as well as other computing applications.

The computing system 600 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 600. External input and output devices can communicate with the system 600 via wired or wireless connections.

In addition, the computing system 600 can provide one or more natural user interfaces (NUIs). For example, the operating system 694 or applications 696 can comprise speech recognition logic as part of a voice user interface that allows a user to operate the system 600 via voice commands. Further, the computing system 600 can comprise input devices and logic that allows a user to interact with the computing system 600 via body, hand, or face gestures.

The system 600 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 600 can further comprise one or more additional antennas coupled to one or more additional receivers, transmitters, and/or transceivers to enable additional functions.

It is to be understood that FIG. 6 illustrates only one example computing system architecture. Computing systems based on alternative architectures can be used to implement technologies described herein. For example, instead of the processors 602 and 604 and the graphics engine 652 being located on discrete integrated circuits, a computing system can comprise an SoC (system-on-a-chip) integrated circuit incorporating multiple processors, a graphics engine, and additional components. Further, a computing system can connect its constituent components via bus or point-to-point configurations different from that shown in FIG. 6. Moreover, the illustrated components in FIG. 6 are not required or all-inclusive, as shown components can be removed and other components added in alternative embodiments.

Figure 7:
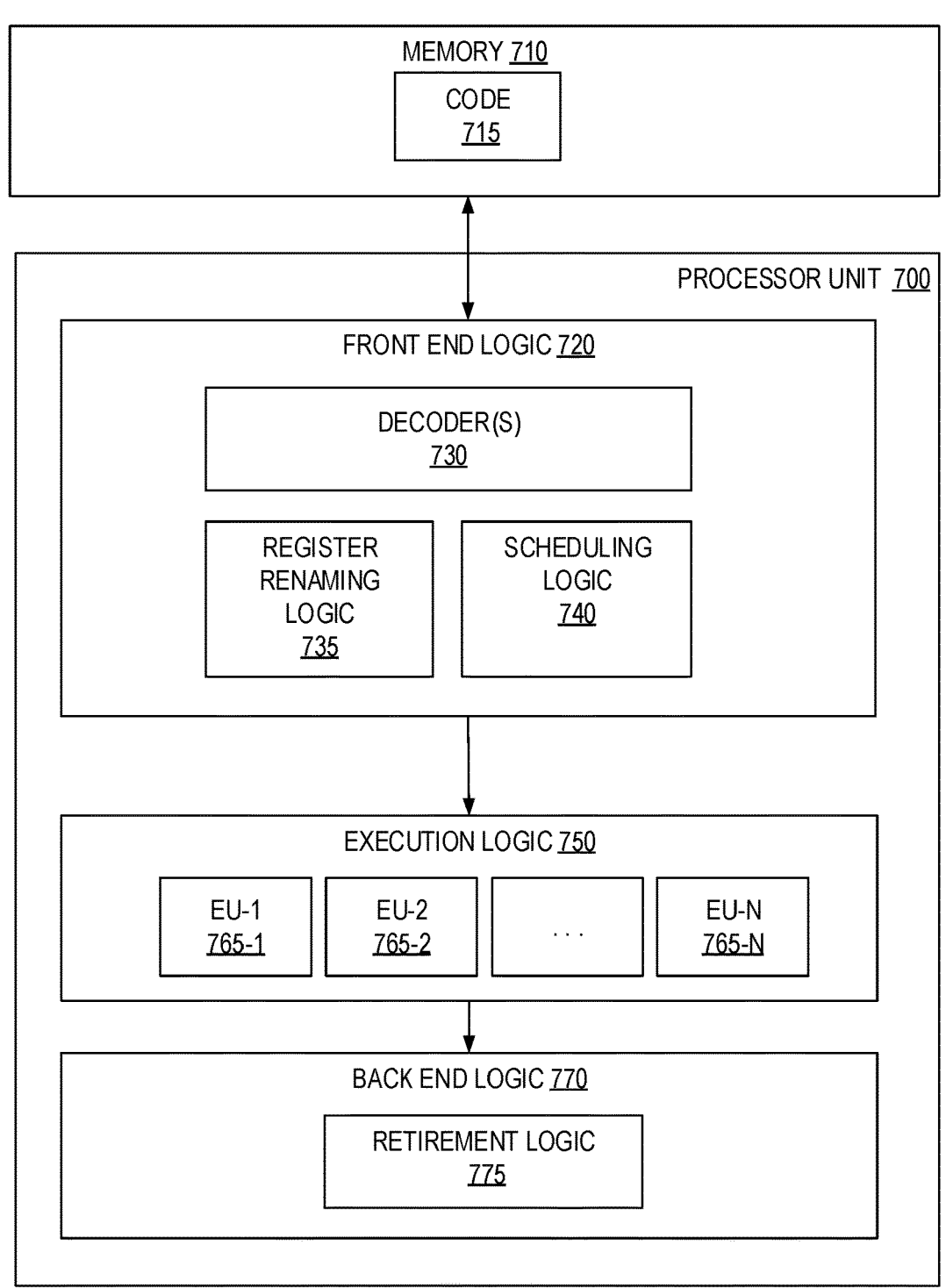
FIG. 7 is a block diagram of an exemplary processor unit that can execute instructions as part of implementing technologies described herein.

FIG. 7 is a block diagram of an example processor unit 700 to execute computer-executable instructions as part of implementing technologies described herein. The processor unit 700 can be a single-threaded core or a multithreaded core in that it may include more than one hardware thread context (or "logical processor") per processor unit.

FIG. 7 also illustrates a memory 710 coupled to the processor unit 700. The memory 710 can be any memory described herein or any other memory known to those of skill in the art. The memory 710 can store computer-executable instructions 715 (code) executable by the processor unit 700.

The processor unit comprises front-end logic 720 that receives instructions from the memory 710. An instruction can be processed by one or more decoders 730. The decoder 730 can generate as its output a micro-operation such as a fixed width micro operation in a predefined format, or generate other instructions, microinstructions, or control signals, which reflect the original code instruction. The front-end logic 720 further comprises register renaming logic 735 and scheduling logic 740, which generally allocate resources and queues operations corresponding to converting an instruction for execution.

The processor unit 700 further comprises execution logic 750, which comprises one or more execution units (EUs) 765-1 through 765-N. Some processor unit embodiments can include a number of execution units dedicated to specific functions or sets of functions. Other embodiments can include only one execution unit or one execution unit that can perform a particular function. The execution logic 750 performs the operations specified by code instructions. After completion of execution of the operations specified by the code instructions, back-end logic 770 retires instructions using retirement logic 775. In some embodiments, the processor unit 700 allows out of order execution but requires in-order retirement of instructions. Retirement logic 775 can take a variety of forms as known to those of skill in the art (e.g., re-order buffers or the like).

The processor unit 700 is transformed during execution of instructions, at least in terms of the output generated by the decoder 730, hardware registers and tables utilized by the register renaming logic 735, and any registers (not shown) modified by the execution logic 750.

As used herein, the term "module" refers to logic that may be implemented in a hardware component or device, software or firmware running on a processor unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processor units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory), optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion thereof) may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, Java, Perl, Python, JavaScript, Adobe Flash, C#, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B, and C. As used in this application and the claims, a list of items joined by the term "at least one of" can mean any combination of the listed terms. For example, the phrase "at least one of A, B, or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method comprising: sending a workload container cryptographic operation request from a workload container to a key caching container, the workload container cryptographic operation request comprising a request for a cryptographic key; and receiving a key handle associated with the cryptographic key from the key caching container at the workload container.

Example 2 comprises the method of Example 1, further comprising: generating, by an application operating within the workload container, the workload container cryptographic operation request; and providing the key handle to the application.

Example 3 comprises the method of Example 1, further comprising: generating, by an application operating within the workload container, an application cryptographic operation request; converting the application cryptographic operation request to the workload container cryptographic operation request; and providing the key handle to the application.

Example 4 comprises the method of one of Examples 1-3, wherein the workload container cryptographic operation request is a first workload container cryptographic operation request, the method further comprising: sending a second workload container cryptographic operation request from the workload container to the key caching container, the second workload container cryptographic operation request comprising the key handle, information indicating a cryptographic operation to be performed by the key caching container, and input data; and receiving output data at the workload container from the key caching container, the output data generated by the key caching container performing the cryptographic operation on the input data.

Example 5 comprises the method of Example 4, further comprising: generating, by an application operating within the workload container, an application cryptographic operation request comprising the key handle, the information indicating the cryptographic operation to be performed by the key caching container, and the input data; and converting the application cryptographic operation request to the workload container cryptographic operation request.

Example 6 comprises the method of Example 4, wherein the cryptographic key is a first cryptographic key, the workload container is a first workload container, the key handle is a first key handle, and the workload container cryptographic operation request is a first workload container cryptographic operation request, the method further comprising: sending a second workload container cryptographic operation request from a second workload container to the key caching container, the second workload container cryptographic operation request comprising a request for a second cryptographic key; and receiving a second key handle associated with the second cryptographic key at the second workload container from the key caching container.

Example 7 comprises the method of Example 6, wherein a first computing system is hosting the first workload container and the key caching container and a second computing system is hosting the second workload container.

Example 8 comprises the method of Example 6, wherein the first workload container, the second workload container, and the key caching container are hosted on a computing system.

Example 9 comprises the method of any one of Examples 1-8, wherein the request for the cryptographic key comprises a request to generate the cryptographic key.

Example 10 comprises the method of any one of Examples 1-8, wherein the request for the cryptographic key comprises a request to load the cryptographic key.

Example 11 comprises the method of any one of Examples 1-10, further comprising the workload container authenticating the key caching container before sending the workload container cryptographic operation request to the key caching container.

Example 12 comprises the method of any one of Examples 1-11, wherein a container runtime engine provides an interface between the workload container and an operating system or a hypervisor.

Example 13 is a method comprising: receiving a workload container cryptographic operation request from a workload container at a key caching container, the workload container cryptographic operation request comprising a request for a cryptographic key; and sending, from the key caching container to the workload container, a key handle associated with the cryptographic key.

Example 14 comprises the method of Example 13, further comprising: requesting the cryptographic key from a key broker service; receiving the cryptographic key from the key broker service; and storing the cryptographic key in an encrypted form in a secure enclave.

Example 15 comprises the method of Example 14, wherein the storing the cryptographic key in the encrypted form in the secure enclave utilizes security-related instructions of a processing unit of a computing system hosting the key caching container.

Example 16 comprises the method of any one of Examples 14-15, further comprising: generating an enclave public-private key pair within a secure enclave, the enclave public-private key pair comprising an enclave public key and an enclave private key; and providing a remotely verifiable signed claim to a key broker service for attestation, the remotely verifiable signed claim comprising a hash of the enclave public key.

Example 17 comprises the method of Example 16, wherein the remotely verifiable signed claim further comprises one or more secure enclave attributes.

Example 18 comprises the method of Example 14, further comprising: generating an enclave public-private key pair within a secure enclave, the enclave public-private key pair comprising an enclave public key and an enclave private key; generating a hash of the enclave public key; and providing a remotely verifiable signed claim and the hash of the enclave public key to the key broker service for attestation, the remotely verifiable signed claim not comprising the enclave public key or the hash of the enclave public key.

Example 19 comprises the method of any one of Examples 13-18, further comprising: receiving a workload container cryptographic operation request from the workload container at the key caching container, the workload container cryptographic operation request comprising the key handle, information indicating a cryptographic operation to be performed by the key caching container, and input data; performing, within a secure enclave, the cryptographic operation on the input data to generate output data, the cryptographic operation utilizing the cryptographic key associated with the key handle, the cryptographic key stored in the secure enclave; and sending the output data from the key caching container to the workload container.

Example 20 comprises the method of Example 19, wherein the cryptographic key is a first cryptographic key, the workload container is a first workload container, the key handle is a first key handle, the input data is first input data, and the output data is first output data, and the workload container cryptographic operation request is a first workload container cryptographic operation request, the method further comprising: receiving, from a second workload container at the key caching container, a second key handle, information indicating a second cryptographic operation to be performed by the key caching container, and second input data; performing, within the secure enclave, the second cryptographic operation on the second input data to generate second output data, the second cryptographic operation utilizing a second cryptographic key associated with the second key handle and stored in the secure enclave; and sending the second output data from the key caching container to the second workload container.

Example 21 comprises the method of Example 20, wherein the second workload container and the key caching container are hosted by a computing system.

Example 22 comprises the method of Example 20, wherein the key caching container is hosted on a first computing system and the second workload container is hosted on a second computing system.

Example 23 comprises the method of any one of Examples 19-22, wherein the performing the cryptographic operation utilizes security-related instructions of a processing unit of a computing system hosting the key caching container.

Example 24 comprises the method of any one of Examples 13-23, wherein a container runtime engine provides an interface between the key caching container and an operating system or a hypervisor.

Example 25 is a method comprising: receiving a request for a cryptographic key from a key caching container; requesting the cryptographic key from a key management service; receiving the cryptographic key from the key management service; encrypting the cryptographic key to generate an encrypted cryptographic key; and sending the encrypted cryptographic key to the key caching container.

Example 26 comprises the method of Example 25, further comprising: receiving an enclave public key of an enclave public-private key pair from the key caching container; encrypting a symmetric encryption key with the enclave public key to generate an encrypted symmetric encryption key; and sending the encrypted symmetric encryption key to the key caching container; wherein the encrypting the cryptographic key comprises encrypting the cryptographic key with the symmetric encryption key.

Example 27 comprises the method of Example 25, further comprising: receiving a signed claim from the key caching container; performing an attestation on the signed claim; and sending the encrypted cryptographic key to the key caching container if the attestation is successful.

Example 28 is a method comprising: deploying a plurality of workload containers to one or more computing systems, individual of the workload containers comprising: an application; and a cryptographic call adapter to convert application cryptographic operation requests made by the application to workload container cryptographic operation requests to be sent to a key caching container; and deploying the key caching container to one of the one or more computing systems, the key caching container to: provision a cryptographic key in response to receiving a first workload container cryptographic operation request comprising a request for the cryptographic key; store the cryptographic key in a secure enclave; and perform a cryptographic operation on input data utilizing the cryptographic key in response to receiving a second workload container cryptographic operation request comprising a key handle associated with the cryptographic key, input data, and information indicating the cryptographic operation to be performed on the input data by the key caching container, the cryptographic operation to utilize the cryptographic key, the cryptographic operation to be performed in the secure enclave.

Example 29 comprises the method of Example 28, wherein the plurality of workload containers and the key caching container are deployed to a computing system.

Example 30 comprises the method of Example 28, wherein a first one of the workload containers is deployed to a first computing system and at least a second one of the workload containers and the key caching container are deployed to a second computing system.

Example 31 is one or more non-transitory computer-readable storage media storing computer-executable instructions that, when executed, cause a computing system to perform a method, the method comprising any one of the methods of Examples 1-30.

Example 32 is an apparatus comprising one or more means to perform any one of the methods of Examples 1-30.

Example 33 is a computing system, comprising: one or more processing units, one or more computer-readable storage media storing instructions that, when executed, cause the one or more processing units to perform any one of the methods of Examples 1-30.

We claim:

1. One or more non-transitory computer-readable storage media storing computer-executable instructions that when executed, cause a computing system to perform a method, the method comprising:

receiving, at the computing system, a container image configured with a key identifier that is used by a workload container instantiated from the container image to request a cryptographic key from an entity external to the workload container;

instantiating the workload container from the container image, the workload container storing the key identifier;

sending a workload container cryptographic operation request from the workload container to a key caching container executing on the computing system, wherein the workload container cryptographic operation request comprises a request for the cryptographic key and the key identifier; and receiving a key handle associated with the cryptographic key from the key caching container at the workload container.

2. The one or more non-transitory computer-readable storage media of claim 1, the method performed by the computing system when the computer-executable instructions are executed further comprising:

generating, by an application operating within the workload container, the workload container cryptographic operation request; and providing the key handle to the application.

3. The one or more non-transitory computer-readable storage media of claim 1, the method performed by the computing system when the computer-executable instructions are executed further comprising:

generating, by an application operating within the workload container, an application cryptographic operation request;

converting the application cryptographic operation request to the workload container cryptographic operation request; and providing the key handle to the application.

4. The one or more non-transitory computer-readable storage media of claim 1, wherein the workload container cryptographic operation request is a first workload container cryptographic operation request, the method performed by the computing system when the computer-executable instructions are executed further comprising:

sending a second workload container cryptographic operation request from the workload container to the key caching container, the second workload container cryptographic operation request comprising the key handle, information indicating a cryptographic operation to be performed by the key caching container, and input data; and receiving output data at the workload container from the key caching container, the output data generated by the key caching container performing the cryptographic operation on the input data.

5. The one or more non-transitory computer-readable storage media of claim 4, the method performed by the computing system when the computer-executable instructions are executed further comprising:

generating, by an application operating within the workload container, an application cryptographic operation request comprising the key handle, the information indicating the cryptographic operation to be performed by the key caching container, and the input data; and converting the application cryptographic operation request to the second workload container cryptographic operation request.

6. The one or more non-transitory computer-readable storage media of claim 1, wherein the cryptographic key is a first cryptographic key, the workload container is a first workload container, the key handle is a first key handle, and the workload container cryptographic operation request is a first workload container cryptographic operation request, the method performed by the computing system when the computer-executable instructions are executed further comprising:

sending a second workload container cryptographic operation request from a second workload container to the key caching container, the second workload container cryptographic operation request comprising a request for a second cryptographic key; and receiving a second key handle associated with the second cryptographic key at the second workload container from the key caching container.

7. The one or more non-transitory computer-readable storage media of claim 6, wherein a first computing system is hosting the first workload container and the key caching container and a second computing system is hosting the second workload container.

8. The one or more non-transitory computer-readable storage media of claim 1, the method performed by the computing system when the computer-executable instructions are executed further comprising the workload container authenticating the key caching container before sending the workload container cryptographic operation request to the key caching container.

9. The one or more non-transitory computer-readable storage media of claim 1, wherein a container runtime engine provides an interface between the workload container and an operating system or a hypervisor.

10. One or more non-transitory computer-readable storage media storing computer-executable instructions that when executed, cause a computing system to perform a method, the method comprising:

receiving a workload container cryptographic operation request from a workload container executing on the computing system at a key caching container, the workload container cryptographic operation request comprising a request for a cryptographic key;

generating an enclave public-private key pair within a secure enclave, the enclave public-private key pair comprising an enclave public key and an enclave private key;

requesting, by the key caching container, the cryptographic key from a key broker service, wherein the key broker service is external to the computing system;

providing a remotely verifiable signed claim to the key broker service for attestation, the remotely verifiable signed claim comprising a hash of the enclave public key;

receiving the cryptographic key from the key broker service;

storing the cryptographic key in an encrypted form in the secure enclave; and in response to receiving the workload container cryptographic operation request comprising the request for the cryptographic key, sending, from the key caching container to the workload container, a key handle associated with the cryptographic key, wherein the key handle uniquely identifies the cryptographic key from among a plurality of cryptographic keys stored in the secure enclave.

11. The one or more non-transitory computer-readable storage media of claim 10, wherein storing the cryptographic key in the encrypted form in the secure enclave utilizes security-related instructions of a processing unit of the computing system.

12. The one or more non-transitory computer-readable storage media of claim 10, wherein the remotely verifiable signed claim further comprises one or more secure enclave attributes.

13. The one or more non-transitory computer-readable storage media of claim 10, wherein the workload container cryptographic operation request is a first workload container cryptographic operation request, the method performed by the computing system when the computer-executable instructions are executed further comprising:

receiving a second workload container cryptographic operation request from the workload container at the key caching container, the second workload container cryptographic operation request comprising the key handle, information indicating a cryptographic operation to be performed by the key caching container, and input data;

performing, within the secure enclave, the cryptographic operation on the input data to generate output data, the cryptographic operation utilizing the cryptographic key associated with the key handle, the cryptographic key stored in the secure enclave; and sending the output data from the key caching container to the workload container.

14. The one or more non-transitory computer-readable storage media of claim 13, wherein the cryptographic key is a first cryptographic key, the workload container is a first workload container, the key handle is a first key handle, the input data is first input data, the output data is first output data, and the cryptographic operation is a first cryptographic operation, the method performed by the computing system when the computer-executable instructions are executed further comprising:

receiving, from a second workload container at the key caching container, a second key handle, information indicating a second cryptographic operation to be performed by the key caching container, and second input data;

performing, within the secure enclave, the second cryptographic operation on the second input data to generate second output data, the second cryptographic operation utilizing a second cryptographic key associated with the second key handle and stored in the secure enclave; and sending the second output data from the key caching container to the second workload container.

15. The one or more non-transitory computer-readable storage media of claim 14, wherein the key caching container is hosted on a first computing system and the second workload container is hosted on a second computing system.

16. A method comprising:

receiving a workload container cryptographic operation request from a workload container at a key caching container, the workload container cryptographic operation request comprising a request for a cryptographic key, the workload container and the key caching container executing on a computing system;

generating an enclave public-private key pair within a secure enclave, the enclave public-private key pair comprising an enclave public key and an enclave private key;

requesting, by the key caching container, the cryptographic key from a key broker service, wherein the key broker service is external to the computing system;

generating a hash of the enclave public key;

providing a remotely verifiable signed claim and the hash of the enclave public key to the key broker service for attestation, the remotely verifiable signed claim not comprising the enclave public key or the hash of the enclave public key;

receiving the cryptographic key from the key broker service;

storing the cryptographic key in an encrypted form in the secure enclave; and in response to receiving the workload container cryptographic operation request comprising the request for the cryptographic key, sending, from the key caching container to the workload container, a key handle associated with the cryptographic key, wherein the key handle uniquely identifies the cryptographic key from among a plurality of cryptographic keys stored in the secure enclave.

17. The method of claim 16, wherein the workload container cryptographic operation request is a first workload container cryptographic operation request, the method further comprising:

receiving a second workload container cryptographic operation request from the workload container at the key caching container, the second workload container cryptographic operation request comprising the key handle, information indicating a cryptographic operation to be performed by the key caching container, and input data;

performing, within the secure enclave, the cryptographic operation on the input data to generate output data, the cryptographic operation utilizing the cryptographic key associated with the key handle, the cryptographic key stored in the secure enclave; and sending the output data from the key caching container to the workload container.

18. The method of claim 17, wherein the cryptographic key is a first cryptographic key, the workload container is a first workload container, the key handle is a first key handle, the input data is first input data, the output data is first output data, and the cryptographic operation is a first cryptographic operation, the method further comprising:

receiving, from a second workload container at the key caching container, a second key handle, information indicating a second cryptographic operation to be performed by the key caching container, and second input data;

performing, within the secure enclave, the second cryptographic operation on the second input data to generate second output data, the second cryptographic operation utilizing a second cryptographic key associated with the second key handle and stored in the secure enclave; and sending the second output data from the key caching container to the second workload container.

19. The method of claim 18, wherein the key caching container is hosted on a first computing system and the second workload container is hosted on a second computing system.

20. The method of claim 16, wherein storing the cryptographic key in the encrypted form in the secure enclave utilizes security-related instructions of a processing unit of the computing system.

* * * * *